Aug. 10, 1926.
F. C. SCHMID
TRUCK AND TRAILER COUPLING
Filed July 20, 1925
1,595,880
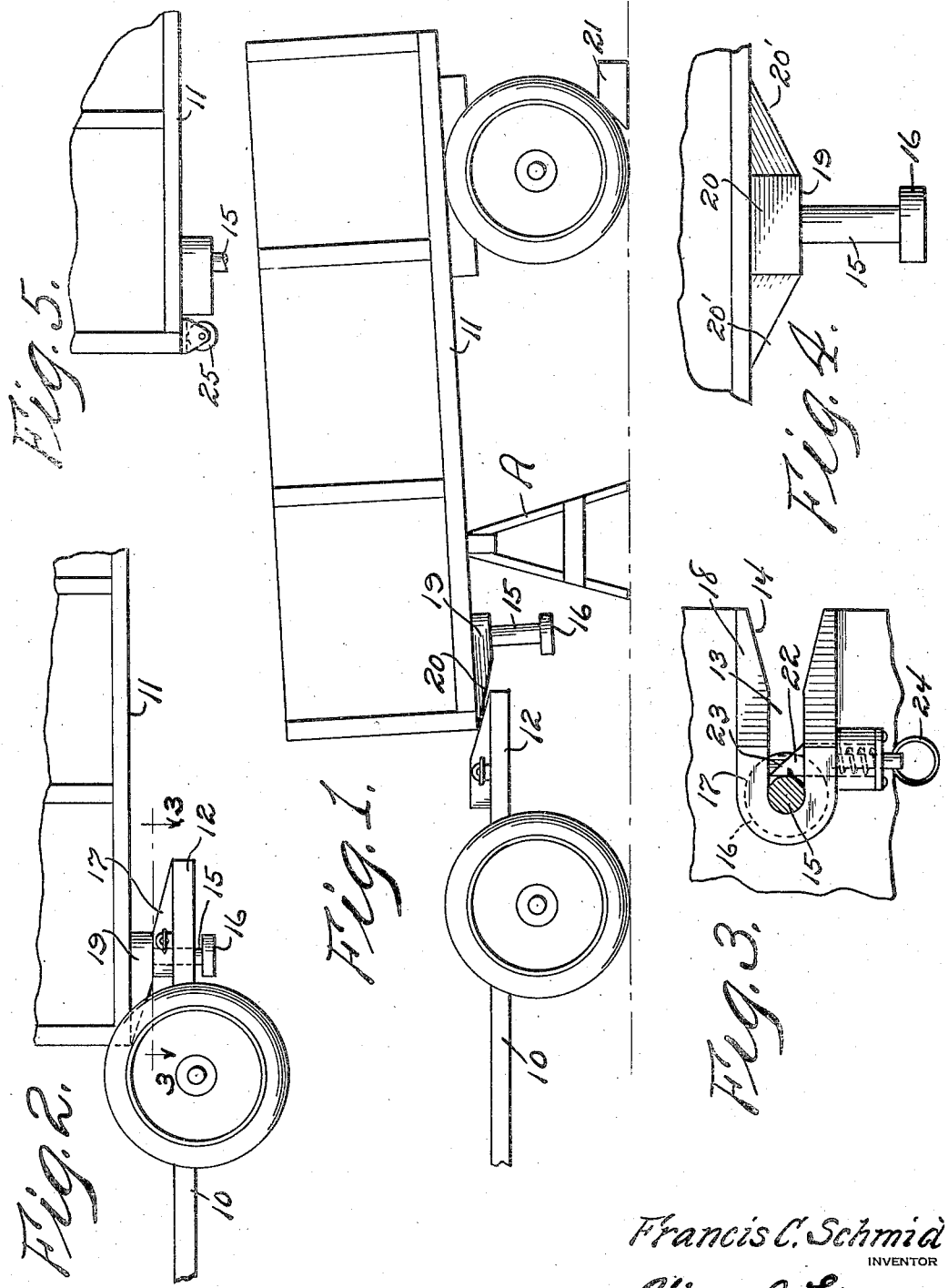
Francis C. Schmid
INVENTOR
BY Victor J. Evans
ATTORNEY
WITNESS Patented Aug. 10, 1926.

1,595,880

UNITED STATES PATENT OFFICE.

FRANCIS C. SCHMID, OF NEW YORK, N. Y.

TRUCK AND TRAILER COUPLING.

Application filed July 20, 1925. Serial No. 44,904.

This invention relates to couplings especially designed for coupling trailers to trucks or tractors, an object being to provide means by which the end of the trailer may rest upon the truck or tractor and thus obviate time and labor usually required in jacking up the trailer.

Another object of the invention is the provision of means for automatically effecting the coupling operation, the said means being operable either by a longitudinal or transverse movement of the truck with respect to the trailer.

With the above and other objects in view, the invention further includes the following novel features and details of construction, to be hereinafter more fully described, illustrated in the accompanying drawings and pointed out in the appended claim.

In the drawings:—

Figure 1 is a side elevation illustrating a fragmentary portion of a truck with a trailer in position for coupling.

Figure 2 is a fragmentary view showing the truck and trailer coupled.

Figure 3 is a detail sectional view on the line 3—3 of Figure 2.

Figure 4 is a fragmentary end view showing a slightly different form of the invention.

Figure 5 is a fragmentary side view of another form.

Referring to the drawings in detail wherein like characters of reference denote corresponding parts, the reference character 10 indicates a portion of a truck which is designed to have attached thereto a trailer indicated at 11. This truck and trailer may be of any suitable construction, or, a tractor may be substituted for the truck.

The truck 10 is provided with a rearwardly extending bifurcated portion 12 which provides a slot 13, the outer portions of which are preferably flared as shown at 14 to facilitate the entrance of a coupling pin 15, the latter being carried by the trailer 11 and preferably provided with a head 16.

Extending around the slot 13 is a flange 17 whose outer ends are beveled or inclined as indicated at 18, so that when the truck is backed beneath the end of the trailer the said trailer end will ride up the inclines 18 with the pin entering the slot 13. This provides means for raising the end of the trailer without requiring the usual jacking up operation, the trailer being raised from its support A, during the coupling operation.

If desired, the trailer may have secured thereto at the inner end of the pin 15 a boss 19 which is provided with a forwardly extending inclined face 20 for contact by the inclines 18 of the flange 17, so as to facilitate raising the trailer. The boss 19 at the inner end of the pin 15 may also be shaped to provide oppositely and laterally inclined faces 20', in addition to the forwardly inclined face 20, as shown in Figure 4 of the drawings. This provides means whereby the coupling operation may be effected either by backing the truck longitudinally of the trailer, or transversely at either side of the trailer. This enables the truck and trailer to be coupled in restricted places. The wheels of the trailer are preferably chocked as indicated at 21.

The slot 13 has extending thereacross, a spring actuated latch 22 which is provided with a beveled face 23 and with a ring or other handle 24. As the trailer rides up the inclined faces 18, the pin 15 will engage the inclined face 23 of the latch 22 and cause the latch to move laterally so that the pin may be positioned between the latch and the inner end of the slot 13, the latch automatically returning to closed position after the passage of the pin. The pin may be released to uncouple the trailer by manually pulling the latch outward.

If desired, the forward end of the trailer may be provided with an anti-friction roller 25 which will ride up the inclined faces 18 of the flange 17, or, anti-friction rollers may be provided in the inclined faces 18 so as to reduce friction when coupling.

The invention is susceptible of various changes in its form, proportions and minor details of construction and the right is herein reserved to make such changes as properly fall within the scope of the appended claim.

Having described the invention what is claimed is:—

In a truck and trailer coupling, a coupling pin, a bifurcated member providing a pin receiving slot, an inclined flange extending upon opposite sides of the slot, an inclined boss around the inner end of the pin for engagement by the inclined flange to elevate the end of the trailer and means to retain the pin within the slot.

In testimony whereof I affix my signature.

FRANCIS C. SCHMID.